United States Patent [19]

Welch

[11] Patent Number: 5,070,897

[45] Date of Patent: Dec. 10, 1991

[54] FLOW CONTROLLER

[75] Inventor: Elmer S. Welch, Silver Lake, Wis.

[73] Assignee: V.Q. Corp., Silver Lake, Wis.

[21] Appl. No.: 668,956

[22] Filed: Mar. 13, 1991

[51] Int. Cl.$^5$ ............................................. G05D 16/00
[52] U.S. Cl. .................................. 137/14; 137/624.11
[58] Field of Search .................... 137/624.11, 14, 495, 137/565; 251/129.01

[56] References Cited

U.S. PATENT DOCUMENTS

| | | | |
|---|---|---|---|
| 3,400,734 | 9/1968 | Rosenberg | 137/624.11 X |
| 3,943,972 | 3/1976 | Bitonti | 137/624.11 |
| 4,478,245 | 10/1984 | Bender | 251/30.01 X |
| 4,535,812 | 8/1985 | Miller | 137/624.11 |
| 4,673,162 | 6/1987 | Lachmann | 251/30.01 |

Primary Examiner—Alan Cohan

Attorney, Agent, or Firm—Goldsmith, Shore, Sutker & Milnamow, Ltd. Dressler

[57] ABSTRACT

In a flow controller, a housing structure connectable in a process line is adapted to receive a process fluid from an upstream pump and to discharge the process fluid to a downstream device. A flow restrictor mounted in the housing structure is movable between an operative position wherein the flow restrictor coacts with the housing structure to define a restricted orifice and an inoperative position. A piston movable within a hydraulic cylinder is connected, via a shaft, to the flow restrictor. A valve controlled by a timer admits a hydraulic fluid, preferably water, into the hydraulic cylinder to move the piston, so as to move the flow restrictor to the operative position and hold it, and permits the hydraulic fluid to drain after a timed interval sufficient to permit the process fluid to fill the process line between the flow controller and the downstream device.

8 Claims, 2 Drawing Sheets

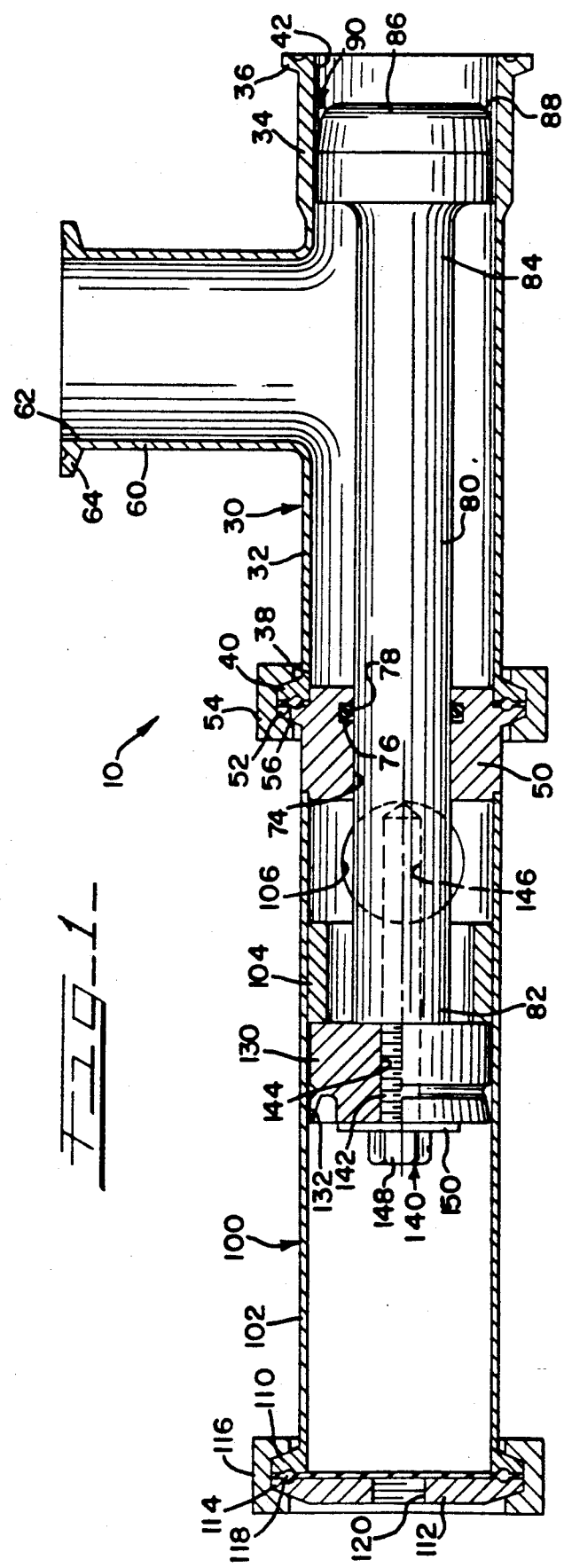

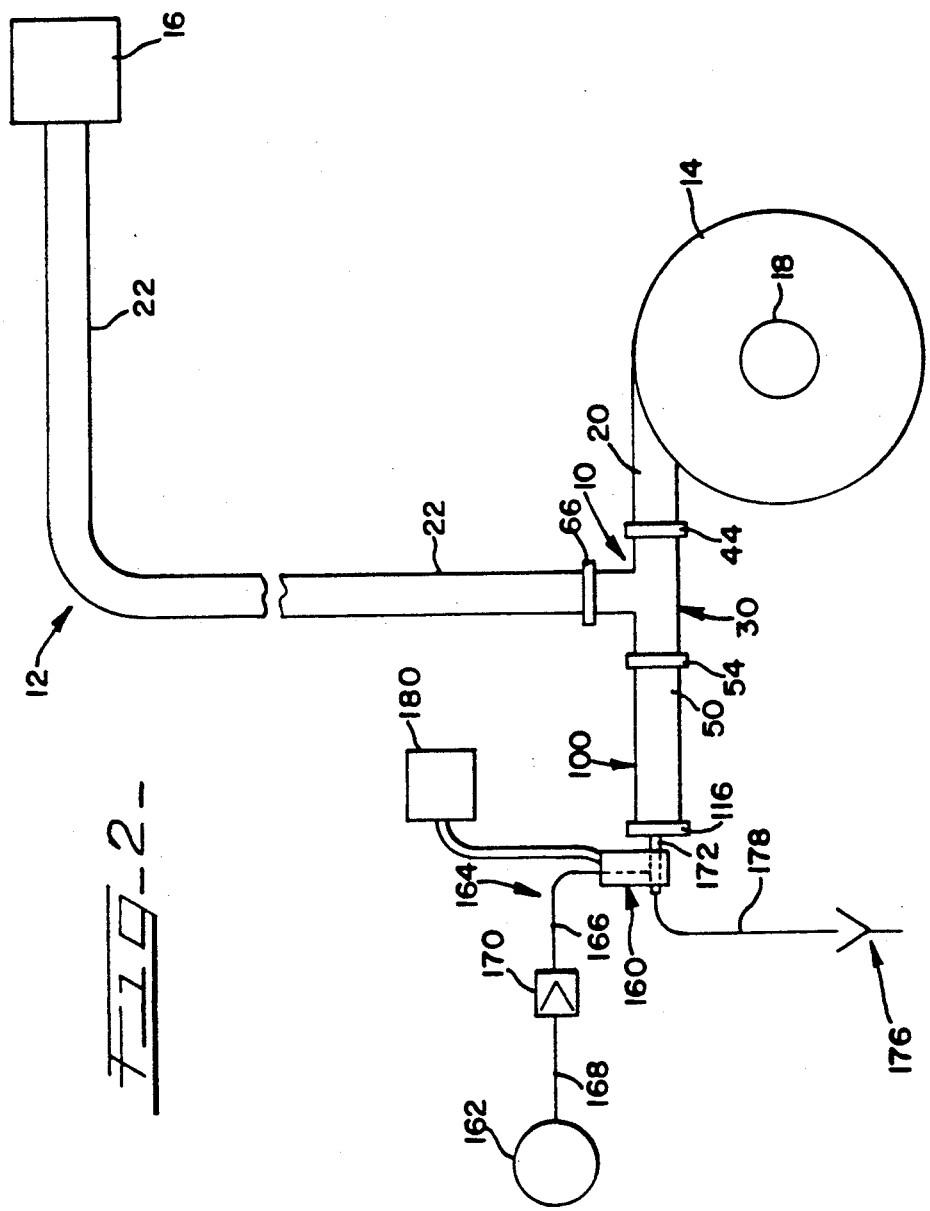

FLOW CONTROLLER

TECHNICAL FIELD OF THE INVENTION

This invention pertains to a flow controller, which is powered hydraulically, for a process line. The flow controller is useful in a dairy plant, in another food plant, or elsewhere, to restrict the flow of a process fluid in a process line, between an upstream pump and a downstream device, until the process fluid has filled the process line between the flow controller and the downstream device.

BACKGROUND OF THE INVENTION

In dairy plants and other food plants, process lines are used to conduct process fluids between upstream pumps, such as centrifugal pumps, and downstream devices of various sorts, such as spray heads, level controls, or other similar or dissimilar devices. The process fluids may be liquids, slurries, aerated liquids, or other substantially liquid, pumpable products, as exemplified by milk, other dairy products, and other food products.

Commonly, in such a plant, a cleaning cycle is employed, in which process lines are cleaned in place, drained, and purged with clean air. Thus, when such lines are returned to active service, such lines are empty of process fluids or other liquids. Therefore, as explained below, certain problems tend to arise when such lines are returned to active service.

Commonly, motor-driven pumps, such as centrifugal pumps, are used to pump process fluids through process lines at flow rates depending upon flow resistances of such lines, flow resistances of downstream devices, and other factors. One problem that tends to arise is that, if a centrifugal pump begins to pump a process fluid into a process line when the process line is empty of the process fluid or any other liquid, the process fluid tends to be initially pumped at a flow rate that is much higher than the flow rate associated with normal operation of the centrifugal pump. The motor driving the centrifugal pump is thus overloaded. These conditions of higher flow rate and pump motor overload tend to prevail until the process fluid fills the process line between the centrifugal pump and a downstream device.

Another problem arises because a line surge is produced when a process fluid is pumped into a process line when the process line is not filled with the process fluid. As a mass of the process fluid cannot be instantly decelerated when the mass reaches a downstream device or any prior restriction in the process line, and as a line surge tends to create abnormally high pressures in the process line, a line surge may damage the process line, the downstream device, line hangers, walls supporting such hangers, or associated equipment. The line surge problem is exacerbated when caustic cleaning solutions or hot food products leak unexpectedly from damaged equipment.

Prior efforts to alleviate these problems have taken three different approaches, which have proved to be very costly to implement. A first approach has been to install a system enabling a slow start (which may be also called a "soft" start) of a motor driving a centrifugal pump. A second approach has been to use a variable-speed motor to drive a centrifugal pump at a slower speed until the process fluid fills the process line and at a higher speed after the process fluid has filled the process line. A third approach has been to install a pneumatically powered valve with a positioner at a discharge end of a centrifugal pump. None of these approaches has proved to be entirely satisfactory.

Therefore, there has been a need, to which this invention is addressed, for a simpler, less costly approach to alleviating these problems, particularly but not exclusively in a dairy plant or another food plant where good sanitation is of paramount importance.

SUMMARY OF THE INVENTION

This invention provides a flow controller, which is powered hydraulically, for a process line arranged to conduct a process fluid when the process fluid is pumped from an upstream pump, such as a centrifugal pump, to a downstream device. The flow controller is operable to restrict the flow of the process fluid until the process fluid has filled the process line between the upstream pump and the downstream device.

The flow controller comprises a housing structure, which is connectable in the process line, and which is adapted when connected therein to receive the process fluid from the upstream pump and to discharge the process fluid to the downstream device. Also, the flow controller comprises a flow restrictor, which is mounted in the housing structure, and which is movable between an operative position and inoperative position. In the operative position, the flow restrictor coacts with the housing structure to define a restricted orifice, which restricts the flow of the process fluid. In the inoperative position, however, the flow restrictor allows the process fluid to flow through the housing structure without any substantial interference from the flow restrictor.

Moreover, the flow controller comprises a hydraulic mechanism, which is used for moving and holding the flow restrictor. The hydraulic mechanism is used for moving the flow restrictor to the operative position and holding the flow restrictor in the operative position before the process fluid has filled the process line between the flow controller and the downstream device. The hydraulic mechanism is used for moving the flow restrictor to the inoperative position after the process fluid has filled the process line between the flow controller and the downstream device.

Preferably, the hydraulic mechanism comprises a hydraulic cylinder, which is mounted in fixed relation to the housing structure, a piston, which is movable within the hydraulic cylinder between an advanced position and a retracted position, and a valve. The piston is connected to the flow restrictor for conjoint movement of the piston and the flow restrictor. The advanced position of the piston corresponds to the operative position of the flow restrictor. The retracted position of the piston corresponds to the inoperative position of the flow restrictor. The valve is connectable to a source of hydraulic fluid, preferably water, and is adapted when connected thereto to admit the hydraulic fluid into the hydraulic cylinder, so as to move the piston to the advanced position, in a first state of the valve and to permit the hydraulic fluid to drain from the hydraulic cylinder in a second state of the valve. The first state is the normal state of the valve, which is switchable to the second state.

Preferably, a timer is provided for switching the valve from the first state to the second state after a timed interval, which begins when the upstream pump is started. The timed interval is sufficient to permit the process fluid to fill the process line between the flow controller and the downstream device.

In a preferred arrangement, the housing structure has a tubular portion defining a process fluid inlet with an inner diameter and defining an axis. Also, the housing structure defines a process fluid outlet, which opens laterally from the tubular portion. Moreover, the housing structure has an aperture in opposed relation to the process fluid inlet. In the preferred arrangement, the flow controller defines a shaft extending through the aperture, in which the shaft is movable axially. The shaft has a proximal end outside the housing structure and a distal end inside the housing structure. The flow restrictor, which is integral with the distal end of the shaft, is cylindrical and has an outer diameter less than the inner diameter of the process fluid inlet. The flow restrictor is movable conjointly with the shaft and is movable axially between the operative and inoperative positions. The hydraulic cylinder mounted in fixed relation to the housing structure, as mentioned above, is mounted in opposed relation to the process fluid inlet. Also, the piston is connected to the proximal end of the shaft for conjoint movement of the piston, the shaft, and the flow restrictor.

A flow controller according to the preferred arrangement described above is rugged, serviceable, and inexpensive compared to known alternatives and can be effectively cleaned without disassembly, i.e., cleaned in place.

This invention contemplates a system comprising an upstream pump, a downstream device, a process line arranged to conduct a process fluid when the process fluid is pumped from the upstream pump to the downstream device, and a flow controller according to this invention. The system may be advantageously used in a dairy, in another food plant, or elsewhere.

These and other objects, features, and advantages of this invention are evident from the following description of a preferred embodiment of this invention with reference to the accompanying drawings.

BRIEF DESCRIPTION OF THE DRAWINGS

FIG. 1 is a cross-sectional view of a flow controller constituting a preferred embodiment of this invention, except for a valve and related components shown in FIG. 2.

FIG. 2 is a diagrammatical layout of the flow controller, a centrifugal pump, a downstream device, and related components, in a typical application.

DETAILED DESCRIPTION OF PREFERRED EMBODIMENT

As shown in FIG. 1, a flow controller 10 constitutes a preferred embodiment of this invention. According to this invention, the flow controller 10 is powered hydraulically. In a typical application, as shown in FIG. 2, the flow controller 10 is connected in a process line 12, between an upstream, centrifugal pump 14 and a downstream device 16, which may be a spray head, a level control, or a similar or dissimilar device. As shown in FIG. 2, the centrifugal pump 14 has an inlet conduit 18, which is connected to a source (not shown) of a process fluid, such as milk or another food product, and an outlet conduit 20, which is connected to the flow controller 10. Besides the centrifugal pump 14 and the downstream device 16, which may be conveniently regarded as components of the process line 12, the process line 12 comprises an elongate conduit 22 connecting the flow controller 10 to the downstream device 16. The flow controller 10 restricts the flow of the process fluid in the process line 12, between the centrifugal pump 14 and the downstream device 16, until the process fluid has filled the process line between the flow controller 10 and the downstream device 16.

The flow controller 10 comprises a housing structure 30 having a tubular portion 32, which has an inlet end 34 with a mounting flange 36 and an opposite end 38 with a mounting flange 40, and which defines an axis. Preferably, the housing structure 30 is fabricated from stainless steel suitable for direct food contact. At the inlet end 34, the tubular portion 32 defines a process fluid inlet 42, which is machined to an inner diameter within close tolerances. At the inlet end 34, the tubular portion 32 is connected to the outlet conduit 20 of the centrifugal pump 14, via a clamping ring 44 engaging the mounting flange 36 on the inlet end 34 and a similar flange (not shown) on the outlet conduit 20 with an annular sealing gasket (not shown) between the mounting flanges engaged by the clamping ring 42. At the opposite end 38, the tubular portion 32 is connected to an annular element 50 having a mounting flange 52, via a clamping ring 54 engaging the mounting flange 40 on the opposite end 38 and the mounting flange 52 on the annular element 50 with an annular sealing gasket 56 between the mounting flanges engaged by the clamping ring 54. Preferably, the annular element 50 is fabricated from stainless steel suitable for direct food contact. The housing structure 30 has a tubular extension 60, which is integral with the tubular portion 32, and which defines a process fluid outlet 62 opening laterally from the tubular portion 32. The tubular extension 60 has a mounting flange 64. The tubular extension 60 is connected to the elongate conduit 22, via a clamping ring 66 engaging the mounting flange 64 on the tubular extension 60 and a similar flange (not shown) on the elongate conduit 22 with an annular sealing gasket (not shown) between the mounting flanges engaged by the clamping ring 66. The annular element 50 has an axial aperture 74 in opposed relation to the process fluid inlet 42. Within the axial aperture 74, the annular element 50 has an annular groove 76, in which an O-ring 78 is seated. Each of the annular sealing gaskets noted above and the O-ring 78 are made from an elastomeric material suitable for direct food contact.

The flow controller 10 comprises a shaft 80, which extends through the axial aperture 74, in which the shaft 80 is movable axially. The O-ring 78 forms a seal around the shaft 80, between the shaft 80 and the annular element 50, but permits axial movement of the shaft 80 relative to the annular element 50. The shaft 80 has a proximal end 82 outside the housing structure 30 and a distal end 84 inside the housing structure 30. The flow controller 10 comprises a flow restrictor 86, which is integral with the shaft 80. Preferably, the shaft 80 and the flow restrictor 86 are machined, as a single piece, from a polymeric material suitable for direct contact with the process fluid, polypropylene being a preferred material. Such a material is used because it is non-galling. Except that the flow restrictor 86 has a rounded edge 88 where the flow restrictor 86 faces away from the proximal end 82 of the shaft 80, the flow restrictor 86 is cylindrical and is machined so as to have an outer diameter within close tolerances. The outer diameter of the flow restrictor 86 is less than the inner diameter of the process fluid inlet 42.

The flow restrictor 86 is movable conjointly with the shaft 80 and is movable axially between an operative position and an inoperative position. In the operative position, the flow restrictor 86 extends into the process fluid inlet 42, as shown in FIG. 1. In the operative position, the flow restrictor 86 coacts with the tubular portion 32 of the housing structure 30, at the process fluid inlet 42, to define an annular, restricted orifice 90, which restricts the flow of the process fluid. In the inoperative position, the flow restrictor 86 is withdrawn axially from the process fluid inlet 42, so as to allow the process fluid to flow from the process fluid outlet 62 without any substantial interference from the flow restrictor 86. In a dairy application wherein milk is being pumped, as an example, the annular, restricted orifice 90 can have a cross-sectional area as small as approximately 0.1 square inch or less. Nevertheless, being made of a polymeric material, the flow restrictor 86 does not gall the tubular portion 32, at the process fluid inlet 42, as the flow restrictor 86 moves between the operative and inoperative positions.

The flow controller 10 comprises a hydraulic cylinder 100, which has a tubular wall 102 welded at one end to the annular element 50, as shown in FIG. 1. An annular stop 104, which is sized so as not to interfere with axial movement of the shaft 80, is welded within the tubular wall 102. The tubular wall 102 has two enlarged, circular holes 106 (one shown in FIG. 1) in diametric opposition to each other, between the annular stop 104 and the annular element 50. The tubular wall 102 has a mounting flange 110 at its end opposite to the end welded to the annular element 50. A closure cap 112 having a peripheral portion 114, which is shaped as the mounting flange 110 is shaped, is mounted to the tubular wall 102 at the mounting flange 110, via a clamping ring 116 engaging the mounting flange 110 and the peripheral portion 114 with an annular sealing gasket 118 between the mounting flange 110 and the peripheral portion 114. The closure cap 112 has an axial aperture 120, which is threaded, as shown in FIG. 2.

The flow controller 10 comprises a piston 130, which has an integral, annular lip seal 132, and which is movable within the tubular wall 102 of the hydraulic cylinder 100, between an advanced position and a retracted position. The piston 130 is connected to the shaft 80 for conjoint movement of the piston 130, the shaft 80, and the flow restrictor 86, via an assembly bolt 140. In the advanced position, the piston 130 engages the annular stop 104, which serves as a travel stop for the piston 130 and as a position stop for the flow restrictor 86. In the retracted position, the piston 130 engages the closure cap 112. The assembly bolt 140 has a threaded shank 142 extending through an axial aperture 144 of the piston 130, into an axial, threaded socket 146 in the proximal end 82 of the shaft 80, and a hex head 148. A washer 150 is interposed between the hex head 148 and the shaft end 82.

A three-way solenoid valve 160 is connected to a source 162 of a hydraulic fluid, preferably water, via a hydraulic fluid line 164 including suitable conduits 166, 168, with a check valve 170 between such conduits 166, 168. The solenoid valve 160 is biased by an internal spring (not shown) to a first state, which is its normal state, but is arranged to be switched to a second state when energized. When the solenoid valve 160 is in its first or normal state, the hydraulic fluid can flow from the source 162, through the check valve 170, and through the solenoid valve 160 to the hydraulic cylinder 100, via a nipple 172 having a threaded end (not shown) coacting with the threaded aperture 120 of the closure cap 112, but cannot flow oppositely because of the check valve 170. When the solenoid valve 160 is in its second state, the solenoid valve 160 connects the hydraulic cylinder 100 to a sump 176, via the nipple 172 and via a conduit 178 between the solenoid valve 160 and the sump 176. When the solenoid valve 160 is in the first state, the solenoid valve 160 permits the hydraulic fluid to flow from the source 162 to the hydraulic cylinder 100, through the solenoid valve 160, and prevents the hydraulic fluid from draining from the hydraulic cylinder 100 to the sump 176. When the solenoid valve 160 is in the second state, the solenoid valve 160 prevents the hydraulic fluid from flowing from the source 162 to the hydraulic cylinder 100 and permits the hydraulic fluid to drain from the hydraulic cylinder 100 to the sump 176, through the solenoid valve 160.

A timer 180 is arranged to control the solenoid valve 160. The timer 180, the solenoid valve 160, and a motor (not shown) driving the centrifugal pump 14 are arranged so that the solenoid valve 160 remains normally in the first or normal state but is switched to the second state whenever the solenoid valve 160 is energized, so that the solenoid valve 160 is deenergized and returns to the first or opened state whenever the motor driving the centrifugal pump 14 is deenergized, and so that the solenoid valve 160 is energized after a timed interval whenever the motor driving the centrifugal pump 14 is energized to drive the centrifugal pump 14. As controlled by the timer 180, the timed interval is sufficient to permit the process fluid to fill the process line 12 between the flow controller 10 and the downstream device 16, even if the process line 12 therebetween is empty of the process fluid or any other liquid when the motor driving the centrifugal pump 14 is energized.

Whenever the solenoid 160 is deenergized, the hydraulic fluid fills the hydraulic cylinder 100 so as to move the piston 130 to the advanced position and so as to move the flow restrictor 86 to the operative position, in which the annular, restricted orifice 90 is defined and restricts the flow of the process fluid. The hydraulic fluid filling the hydraulic cylinder 100 forms a hydraulic block, which holds the piston 130 in the advanced position, and which holds the flow restrictor 86 in the operative position. Any hydraulic fluid leaking past the lip seal 132 on the piston 130 is discharged through the holes 106 in the tubular wall 102.

Whenever the motor driving the centrifugal pump 14 is energized, the solenoid valve 160 is energized after the timed interval controlled by the timer 180, whereupon the hydraulic fluid is permitted to drain from the hydraulic cylinder 100, through the solenoid valve 160, to the sump 176, so as to permit the process fluid flowing past the flow restrictor 86, through the annular, restricted orifice 90, to move the flow restrictor 86 to the inoperative position and to move the piston 130 to the retracted position. A coiled spring (not shown) may be optionally provided around the shaft 80, between the annular element 50 and the piston 130, so as to assist in moving the piston 130 to the retracted position and the flow restrictor 86 to the inoperative position. Any process fluid leaking past the O-ring 78 forming a seal around the shaft 80 is discharged through the holes 106 in the tubular wall 102.

Various modifications may be made in the flow controller disclosed herein without departing from the scope and spirit of this invention.

I claim:

1. For a process line arranged to conduct a process fluid when the process fluid is pumped from an upstream pump to a downstream device, a flow controller comprising a housing structure connectable in the process line and adapted when connected therein to receive the process fluid from the upstream pump and to discharge the process fluid to the downstream device, a flow restrictor mounted in the housing structure and movable between an operative position wherein the flow restrictor coacts with the housing structure to define a restricted orifice, which restricts the flow of the process fluid, and an inoperative position wherein the flow restrictor allows the process fluid to flow through the housing structure without any substantial interference from the flow restrictor, and means including hydraulic means and timer means responsive to initiation of operation of the pump for moving the flow restrictor to the operative position and holding the flow restrictor in the operative position before the process fluid has filled the process line between the flow controller and the downstream device and for permitting the process fluid to move the flow restrictor to the inoperative position after a timed interval after starting of the pump sufficient to permit the process fluid to fill the process line between the flow controller and the downstream device.

2. The flow controller of claim 1 wherein the hydraulic means comprises a hydraulic cylinder mounted in fixed relation to the housing structure, a piston movable within the hydraulic cylinder between an advanced position and a retracted position and connected to the flow restrictor for conjoint movement of the piston and the flow restrictor, and valve means connectable to a source of a hydraulic fluid and adapted when connected thereto to admit the hydraulic fluid into the hydraulic cylinder, so as to move the piston to the advanced position, in a first state of the valve means and to permit the hydraulic fluid to drain from the hydraulic cylinder in a second state of the valve means, the first state being the normal state of the valve means, which is switchable to the second state, and wherein the advanced position of the piston corresponds to the operative position of the flow restrictor and the retracted position of the piston corresponds to the inoperative position of the flow restrictor.

3. For a process line arranged to conduct a process fluid when the process fluid is pumped from an upstream pump to a downstream device, a flow controller comprising a housing structure connectable in the process line and adapted when connected therein to receive the process fluid from the upstream pump and to discharge the process fluid to the downstream device, a flow restrictor mounted in the housing structure and movable between an operative position wherein the flow restrictor coacts with the housing structure to define a restricted orifice, which restricts the flow of the process fluid, and an inoperative position wherein the flow restrictor allows the process fluid to flow through the housing structure without any substantial interference from the flow restrictor, and hydraulic means for moving the flow restrictor to the operative position and holding the flow restrictor in the operative position before the process fluid has filled the process line between the flow controller and the downstream device and for permitting the process fluid to move the flow restrictor to the inoperative position after the process fluid has filled the process line between the flow controller and the downstream device;

wherein the hydraulic means comprises a hydraulic cylinder mounted in fixed relation to the housing structure, a piston movable within the hydraulic cylinder between an advanced position and a retracted position and connected to the flow restrictor for conjoint movement of the piston and the flow restrictor, and valve means connectable to a source of a hydraulic fluid and adapted when connected thereto to admit the hydraulic fluid into the hydraulic cylinder, so as to move the piston to the advanced position in a first state of the valve means and to permit the hydraulic fluid to drain from the hydraulic cylinder in a second state of the valve means, the first state being the normal state of the valve means, which is switchable to the second state, wherein the advanced position of the piston corresponds to the operative position of the flow restrictor and the retracted position of the piston corresponds to the inoperative position of the flow restrictor; and wherein the flow controller comprises timer means responsive to initiation of operation of the pump for switching the valve means from the first state to the second state after a timed interval after starting of the pump sufficient to permit the process fluid to fill the process line between the flow controller and the downstream device.

4. For a process line arranged to conduct a process fluid when the process fluid is pumped from an upstream pump to a downstream device, a flow controller comprising (a) a housing structure connectable in the process line and adapted when connected therein to receive the process fluid from the upstream pump and to discharge the process fluid to the downstream device, the housing structure having a tubular portion defining a process fluid inlet with a specified diameter and defining an axis, the housing structure defining a process fluid outlet opening laterally from the tubular portion, the housing structure having an aperture in opposed relation to the process fluid inlet, (b) a shaft extending through the aperture, in which the shaft is movable axially, the shaft having a proximal end and a distal end, the proximal end being outside the housing structure, the distal end being inside the housing structure, (c) a flow restrictor integral with the distal end of the shaft, the flow restrictor being cylindrical and having a specified diameter less than the specified diameter of the process fluid inlet, the flow restrictor being movable conjointly with the shaft and axially between an operative position wherein the flow restrictor extends into the process fluid inlet and coacts with the housing structure at the process fluid inlet to define a restricted orifice, which restricts the flow of the process fluid, and an inoperative position wherein the flow restrictor is withdrawn axially from the process fluid inlet so as to allow the process fluid to flow from the process fluid inlet to the process fluid outlet without any substantial interference from the flow restrictor, (d) a hydraulic cylinder mounted in fixed relation to the housing structure in opposed relation to the process fluid inlet and a piston movable within the hydraulic cylinder between an advanced position and a retracted position, the piston being connected to the proximal end of the shaft for conjoint movement of the piston, the shaft, and the flow restrictor, and (e) valve means connectable to a source of a hydraulic fluid and adapted when connected thereto to admit the hydraulic fluid into the hydraulic cylinder, so as to move the piston to the advanced position, in a first state of the valve means and to permit the hydraulic fluid to drain from the hydraulic cylinder in a second state of the valve means, the first state being the normal state of the valve means, which is switchable to the second state, wherein the advanced position of the piston corresponds to the operative position of the flow restrictor and the retracted position of the piston corresponds to the inoperative position of the flow restrictor.

5. The flow controller of claim 4 comprising (f) timer means for switching the valve means from the first state to the second state after a timed interval beginning when the upstream pump is started and being sufficient to permit the process fluid to fill the process line between the flow controller and the downstream device.

6. A system comprising an upstream pump, a downstream device, a process line arranged to conduct a process fluid when the process fluid is pumped from the upstream pump to the downstream device, and a flow controller connected in the process line, between the upstream pump and the downstream device, the flow controller comprising a housing structure connected in the process line and adapted to receive the process fluid from the upstream pump and to discharge the process fluid to the downstream device, a flow restrictor mounted in the housing structure and movable between an operative position wherein the flow restrictor coacts with the housing structure to define a restricted orifice, which restricts the flow of the process fluid, and an inoperative position wherein the flow restrictor allows the process fluid to flow through the housing structure without any substantial interference from the flow restrictor, and means including hydraulic means and timer means responsive to initiation of operation of the pump for moving the flow restrictor to the operative position and holding the flow restrictor in the operative position before the process fluid has filled the process line between the flow controller and the downstream device and for permitting the process fluid to move the flow restrictor to the inoperative position after a timed interval after starting of the pump sufficient to permit the process fluid to fill the process line between the flow controller and the downstream device.

7. The flow controller of claim 6 wherein the hydraulic means comprises a hydraulic cylinder mounted in fixed relation to the housing structure, a piston movable within the hydraulic cylinder between an advanced position and a retracted position and connected to the flow restrictor for conjoint movement of the piston and the flow restrictor, and valve means connectable to a source of a hydraulic fluid and adapted when connected thereto to admit the hydraulic fluid into the hydraulic cylinder, so as to move the piston to the advanced position, in a first state of the valve means and to permit the hydraulic fluid to drain from the hydraulic cylinder in a second state of the valve means, the first state being the normal state of the valve means, which is switchable to the second state, and wherein the advanced position of the piston corresponds to the operative position of the flow restrictor and the retracted position of the piston corresponds to the inoperative position of the flow restrictor.

8. A system comprising an upstream pump, a downstream device, a process line arranged to conduct a process fluid when the process fluid is pumped from the upstream pump to the downstream device, and a flow controller connected in the process line, between the upstream pump and the downstream device, the flow controller comprising a housing structure connected in the process line and adapted to receive the process fluid from the upstream pump and to discharge the process fluid to the downstream device, a flow restrictor mounted in the housing structure and movable between an operative position wherein the flow restrictor coacts with the housing structure to define a restricted orifice, which restricts the flow of the process fluid, and an inoperative position wherein the flow restrictor allows the process fluid to flow through the housing structure without any substantial interference from the flow restrictor, and hydraulic means for moving the flow restrictor to the operative position and holding the flow restrictor in the operative position before the process fluid has filled the process line between the flow controller and the downstream device and for permitting the process fluid to move the flow restrictor to the inoperative position after the process fluid has filled the process line between the flow controller and the downstream device;

wherein the hydraulic means comprises a hydraulic cylinder mounted in fixed relation to the housing structure, a piston movable within the hydraulic cylinder between an advanced position and a retracted position and connected to the flow restrictor for conjoint movement of the piston and the flow restrictor, and valve means connectable to a source of a hydraulic fluid and adapted when connected thereto to admit the hydraulic fluid into the hydraulic cylinder, so as to move the piston to the advanced position in a first state of the valve means and to permit the hydraulic fluid to drain from the hydraulic cylinder in a second state of the valve means, the first state being the normal state of the valve means, which is switchable to the second state, and wherein the advanced position of the piston corresponds to the operative position of the flow restrictor and the retracted position of the piston corresponds to the inoperative position of the flow restrictor; and wherein the flow controller comprises timer means responsive to initiation of operation of the pump for switching the valve means from the first state to the second state after a timed interval after starting of the pump sufficient to permit the process fluid to fill the process line between the flow controller and the downstream device.

* * * * *